Oct. 25, 1932.  C. F. GERLINGER  1,884,657
CAR AXLE DRIVE FOR ELECTRIC LIGHTING SYSTEMS AND OTHER PURPOSES
Filed Dec. 30, 1931  5 Sheets-Sheet 1
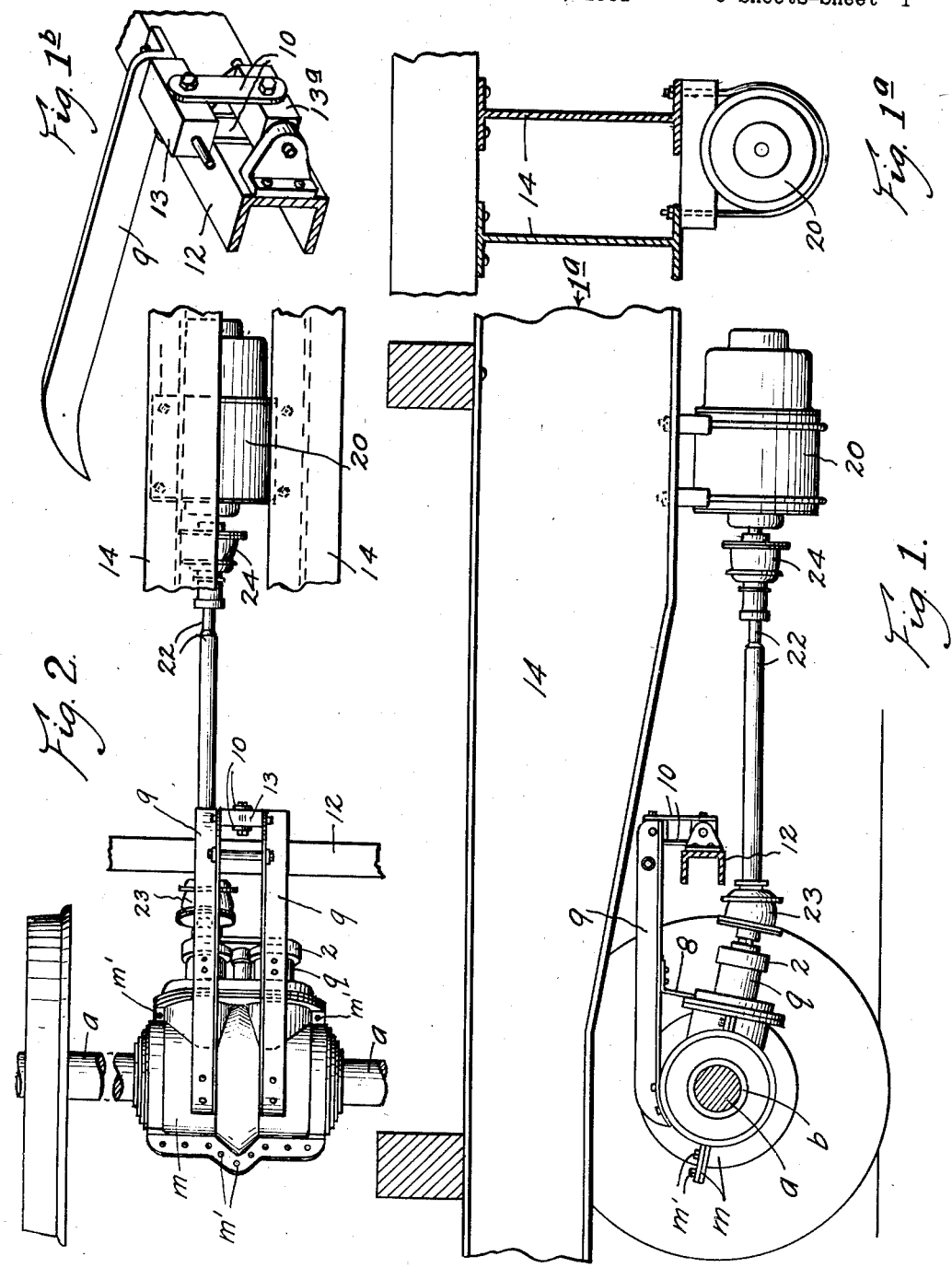
INVENTOR
Carl F. Gerlinger
ATTORNEY

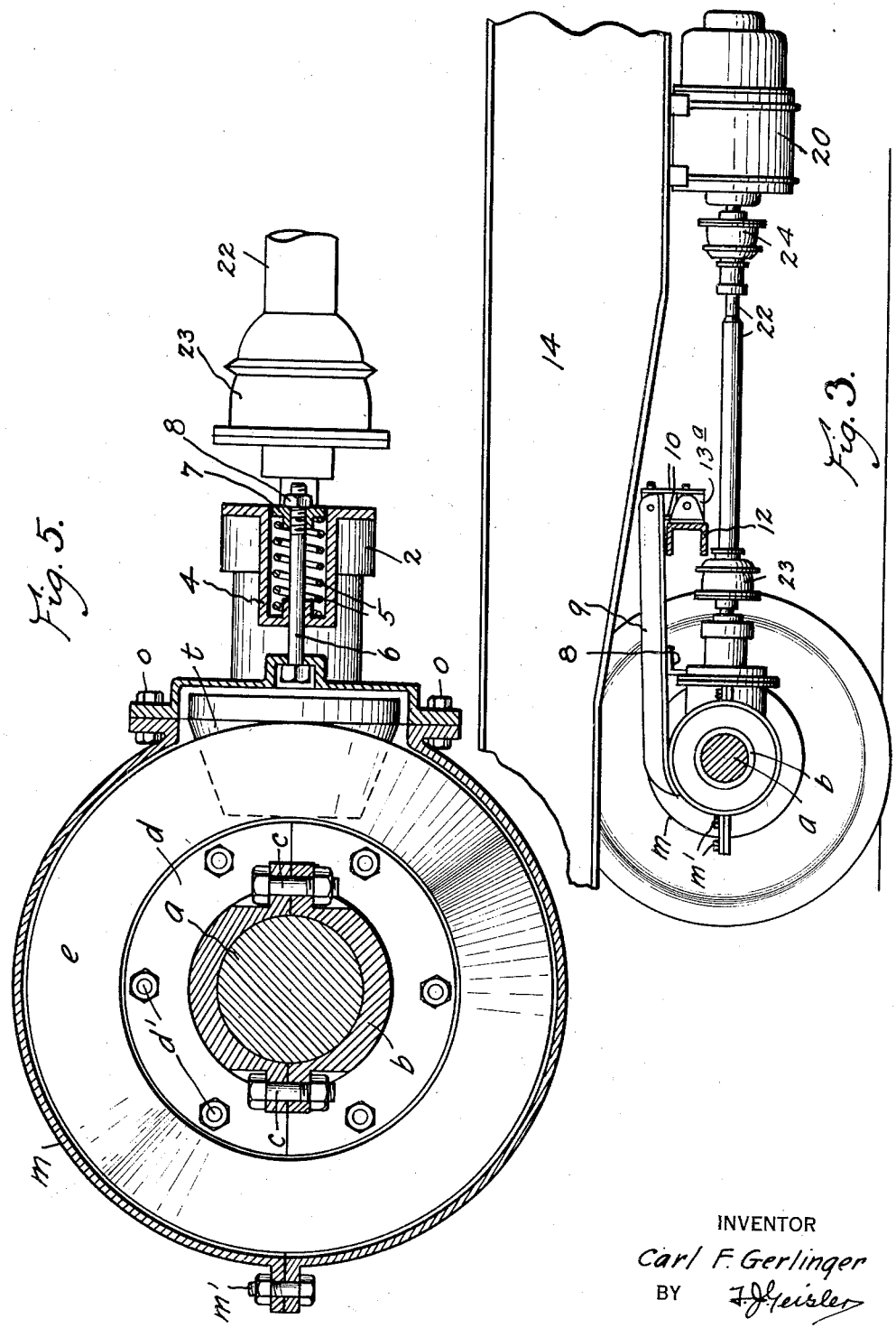

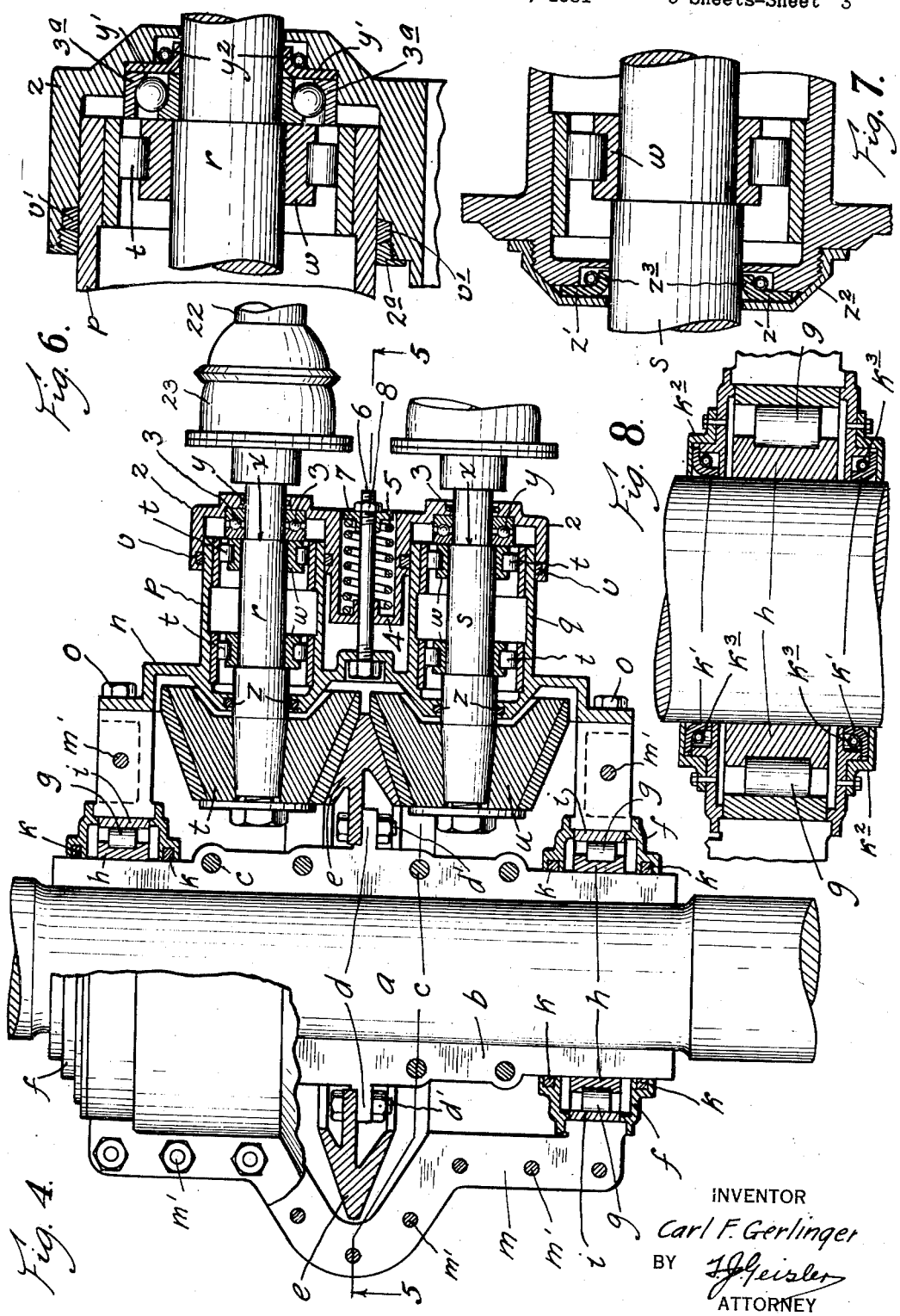

Oct. 25, 1932.  C. F. GERLINGER  1,884,657
CAR AXLE DRIVE FOR ELECTRIC LIGHTING SYSTEMS AND OTHER PURPOSES
Filed Dec. 30, 1931   5 Sheets-Sheet 4
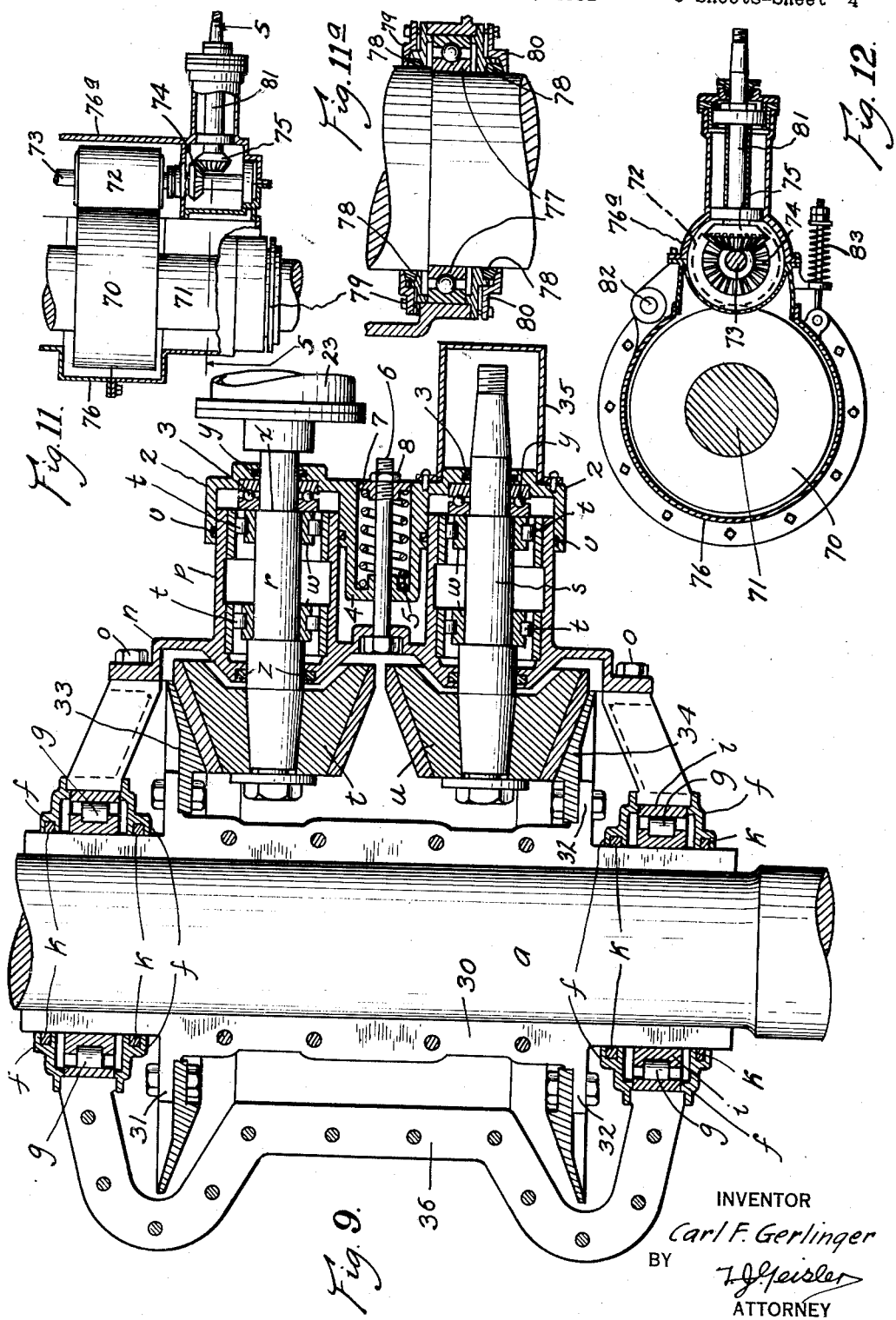
INVENTOR
*Carl F. Gerlinger*
BY
*T.J.Geisler*
ATTORNEY

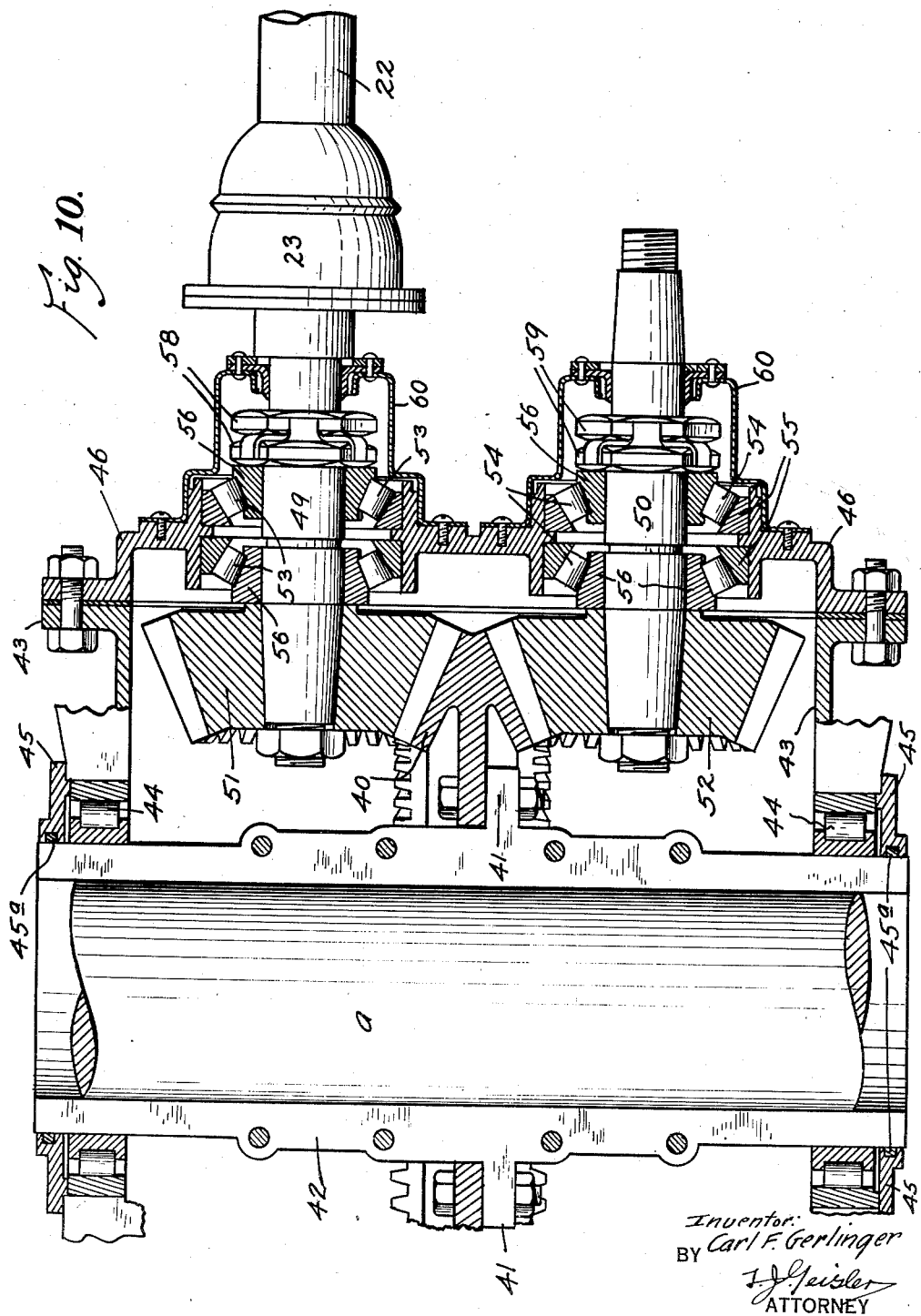

Patented Oct. 25, 1932

1,884,657

UNITED STATES PATENT OFFICE

CARL F. GERLINGER, OF DALLAS, OREGON

CAR AXLE DRIVE FOR ELECTRIC LIGHTING SYSTEMS AND OTHER PURPOSES

Application filed December 30, 1931. Serial No. 583,905.

My invention relates particularly to devices for using the rotation of a wheel axle of a railroad car as a force, or drive, for operating the generator of an electric car lighting system or other equipment of the car.

Various means have heretofore been tried for transmitting the power of a car axle, particularly as a driving force for the generator of an electric car lighting system; these means including belts, spur-gears, and even friction gears, but failed both from the standpoint of dependability and life in service.

The particular object of my invention is to provide efficient and dependable means for transmitting the power from a car axle to the electric generator, or other device; and to use means which will transmit the power steadily, and not be effected by the jars of the car while in motion, and not tend to exert any side thrust and thus crowd the axle to one side or the other, which not only would tend to cause undue wear of the wheel flanges, but also introduce danger of derailment.

The power transmitting devices of my drive may be either toothed gears or friction gears. Preferably I employ the latter, and for that reason the description of my invention is in the main as a friction drive.

A further feature of my invention is, it is adapted to operate two or more devices from the same car axle simultaneously; for example, an electric car lighting system and a car cooling system. When my device is so arranged it comprises a driving friction disc or element carried rigid by the axle, and two driven pinions or elements engaging opposite sides of the driving element; and the driven elements must be maintained with equal pressure on the opposite sides of the driving element.

But there is likely to be unequal wear of the two pinions of the driven element. In that event, unless the axes of the two driven pinions may shift relatively to such wear there would be a tendency for one of them to crowd, and exert side thrust on the driving disc and therewith on the car axle, which crowding, as mentioned, would tend to set up unequal wear of the wheel flanges, and danger of derailment.

To prevent such result, I mount the housing carrying the driven pinions movable as a unit parallel with the axis of the car axle, so that the housing may shift laterally, and thus remain centralized with the driving element; in that way permitting the driven element to shift in response to any unequal wear of its members, and maintaining constant equal pressure by the members of the driven element on the driving element; and preventing side thrusts or crowding of the latter, and the car axle.

The housing is made in two sections to facilitate placing of the same over the drive. The housing is suspended from the truck frame by links, which may be resilient, that is, made of springs; the suspending means being adapted to accommodate both vertical and horizontal movement of the housing relatively to the truck frame, so as to provide for both vertical and horizontal movement of the car axle in relation to the truck frame. The housing is mounted on anti-friction bearings, and its ends are provided with means for retaining grease about the bearings, and for excluding dirt, water and weather.

The details of construction, and the operation of my drive are hereinafter fully described with reference to the accompanying drawings.

In the drawings:

Fig. 1 shows in side elevation a portion of a car frame, a portion of a car wheel truck, and one of the car axles journaled in the truck, and this view illustrates the arrangement of my drive for operating the generator of an electric lighting system of a car;

Fig. 1a shows a cross section approximately taken on the line pointed to by the arrow 1a in Fig. 1;

Fig. 1b shows a fragmentary perspective view of the suspension means for my drive;

Fig. 2 shows a partial top view of my drive and parts shown in Fig. 1;

Fig. 3 shows a fragmentary side elevation similar to Fig. 1 and illustrates my drive and its operative connection to the generator arranged in horizontal alignment;

Fig. 4 shows a fragmentary top view partly in horizontal section, illustrating my invention as a friction drive and to operate two independent devices simultaneously;

Fig. 5 shows a longitudinal vertical section taken on the line pointed to by the arrow 5 in Fig. 4;

Fig. 6 shows a sectional detail of a modification of the thrust bearing and the lubricant retaining means for the outer end of the shafts of the driven pinions shown in Fig. 4;

Fig. 7 shows a modification of the construction of the inner ends of the journal boxes of said shafts, and the lubricant retaining means;

Fig. 8 shows a modification of the annular "retainers" carried by the sleeve mounted on the car axle, and the lubricant retaining means therefor;

Fig. 9 shows a modification of my drive in which the driving element is arranged to engage the outer faces of the driven element, instead of the construction shown in Fig. 4 in which the driven element lies between and engages with inner faces of the two pinions of the driving element;

Fig. 10 illustrates the use and arrangement of a toothed driving gear embodying my invention;

Fig. 11 shows an example of a modification of my car axle drive. As here shown the drive is composed of cylindrical driving and driven friction gears, and spur gears;

Fig. 11a shows an enlargement of a portion of Fig. 11; and

Fig. 12 shows a transverse section on the line pointed to by the arrows 5 in Fig. 11, with one of the members shown in full.

Referring first to Fig. 4 as illustrating the principle of construction and operation of my drive, the drive here shown being of the friction gear type:

On the car wheel axle $a$ is mounted a sleeve $b$. It is assumed that the car axle, originally concaved towards the middle as common, has been machined down to true cylindric surface and the sleeve $b$ which is divided and the parts secured together by bolts $c$ is rigidly mounted on the middle portion of the car axle.

The purpose of such arrangement is to permit the convenient placing of the parts of my drive mounted on the axle. The sleeve is made with a circumferential flange $d$ and thereon is rigidly secured a friction gear element $e$ by bolts $d'$. On the ends of the sleeve are mounted longitudinally movable annular retainers $f, f$. In these retainers are housed roller bearings $g$ seated on interior races $h$ fast on the sleeve $b$. The retainers $f, f$ are adapted to hold packing rings $k, k$ to keep out dirt and to prevent lubricant leaking onto the friction gear $e$.

On the retainers $f, f$ is mounted, for relative rotation, a split annular housing $m$, bolted together by bolts $m'$ which incloses the driving friction gear $e$. The bearing surfaces $i$ of the housing $m$ ride upon and serve as exterior races for the roller bearings $g$ and permit a limited movement longitudinal of the axle. A housing section $n$ is bolted to the housing $m$ by bolts $o$, which comprises spaced journal box portions $p, q$ in which are journaled shafts $r, s$ carrying driven, friction, pinion gears $t, u$ which are arranged to engage with the opposite sides of the driving friction gear $e$.

The housing however may, if preferred, be mounted directly on the car axle instead of interposing a split sleeve as described. The split sleeve is interposed merely as a convenience in construction if deemed preferable.

The shafts $r$ and $s$ are journaled on slidable roller bearings $t$; the inside races $w$ of which are fast on the shafts $r, s$. The outer ends of the said shafts $r, s$ are shouldered as at $x$ which bear upon thrust bearings 3.

The inner ends of the journal box portions $p, q$ are provided with a packing $z$ to prevent lubricant getting down to the friction pinions. The outer ends of the journal box portions $p, q$ are closed by a cover section 2 which is seated on the thrust bearings 3. The cover 2 is provided with a packing $v$ to prevent the escape of lubricant between the cover 2 and the journal box portions $p, q$ and with a packing $y$ to prevent lubricant escaping past the shafts $r, s$.

The cover 2 is formed with a middle portion 4 located in the space between the journal box portions $p, q$ and in such middle cover portion is located a coil spring 5 bearing on the bottom of said middle cover portion and mounted on a bolt 6 which is provided with a plate 7; and a nut 8 provides the means for placing the spring 5 in tension so as to draw the cover down and therewith impose a thrust on the thrust bearings $y$ moving the shafts $r, s$ inward, and thereby holding the friction pinions $t, u$ with proper friction pressure on the driving friction gear $e$.

The housing $n$, see Figs. 1, 1a and 3, is suspended on the truck frame by suitable brackets 8 depending from arms 9 which are rigidly secured at one end to the housing $m$ and pivotally secured at the other end to links 10, the latter in turn being pivotally secured to a transverse member 12 of the truck frame. The links 10 comprise a cross head 13, see Fig. 1b, which is pivotally secured between the arms 9 for movement on an axis transverse of the car frame, and the links 10 are pivotally secured to such cross head on an axis longitudinal of the car frame. The lower ends of the links 10 are also pivotally secured to the cross head 13a which is in turn pivotally secured to the said transverse member 12 of the truck frame for movement on a transverse axis. Thus a universal movement of the arms 9 and links 10 is provided which will accommodate both lateral and vertical movement of my drive relatively to the truck frame and the car axle and also accommodate any slight longitudinal movement of the car axle relatively to the truck frame.

The projecting ends of the shafts r, s may be connected by suitable operative connections to the devices to be operated, for example, the electric generator 20, as shown in Figs. 1 and 3 and an air conditioning or ventilating device for the car, not shown.

Such connections must be flexible to accommodate both horizontal and vertical movement of the truck frame and therewith the car axle, relatively to the car frame 14. Further, to accommodate such movements, the connections must yield to longitudinal displacement, as for example, the shortening of the operative connection when the car truck is turning while following the track.

To this end, I provide telescoping shaft sections 22, connected at their ends, respectively, by universal couplings 23, 24 to the shafts r, s and the devices to be operated.

The differences between the arrangements of said operative connections and the suspension means, shown in Figs. 1 and 3, are merely changes in position necessitated by the arrangement of the parts relatively to the car frame 14.

As has been noted, the housing and the parts of the drive thereby inclosed are movable longitudinally as a unit on the sleeve b. This permits the friction drive e to be centralized at all times between the friction pinions t, u so as to place the driving and driven friction elements in proper alignment and so maintain the same.

In other words, the relative wear of the friction gear e and pinions t, u will be automatically taken up by the thrust of the spring 5 and unequal wear will be compensated by both pinions moving inwardly and laterally as a unit on the driving friction gear e, and thus an equal and balanced pressure will be maintained on the gear e.

By this arrangement all lateral thrust on the car axle which would tend to cause undue wear of the axle flanges or introduce the danger of derailment is avoided as there is no tendency to cause the crowding of the car axle to one side or the other.

As mentioned, I preferably so construct my drive as to be able to utilize the same for operating simultaneously two different devices, as for example, the generator 20 of an electric car lighting system and also a means for conditioning the air in the car, not shown. The suspending arms 9 may be made of resilient material or in the form of springs. By the described arrangement of my drive and its connections and the suspending means of the housing thereof from the truck frame, my drive is not effected by the jars of the car while in motion, nor is the normal lateral movement of the car axle in its journal bearings restrained.

In Figs. 6 and 7 I have shown the lubricant packings y and z of the journal box portions p, q shown in Fig. 4, substituted by leather or felt washers y', z', respectively, the inner portions of which lie in surface contact with the shafts r, s respectively. The washers y' are clamped between the cover 2 and the housing n and held in close contact with the shafts by split ring members y2. The washers z' are clamped on the inner ends of the journal box portions p, q by threaded caps z2 and are held in close contact with the shafts r, s by split ring members z3. In Fig. 6 the lubricant packing v' of the cover 2 is held in place by a nut 2a and the thrust bearings 3 of Fig. 4 have been substituted by combined radial and thrust bearings 3a.

In Fig. 8 I have shown a modification of the retainers f, f shown in Fig. 4, in which the packing rings k, k are substituted by leather or felt washers k', k' similar to those described with reference to Figs. 6 and 7, clamped in place by collars k2, k2 and held closely in contact with the sleeve b by split ring members k3, k3.

In Fig. 9 I have shown a modification of my drive, in which the sleeve 30, rigidly mounted on the car axle a is provided with spaced circumferential flanges 31, 32 adjacent the ends upon which are secured bevel friction gears 33, 34 arranged to engage respectively, the outer faces of the friction pinions t, u. Otherwise, this construction of my drive and the operation is the same as that before described and similar reference characters indicate similar parts. The housing 36 inclosing the driving friction gears is modified to accommodate such change in construction.

Further in Fig. 9 I have shown how, if my drive is to be used for driving only one device, for example, the electric generator, the shaft s may be allowed to rotate freely and its projecting end may be covered with a cap 35 to keep out dust and dirt.

In Fig. 10 I have shown my drive provided with toothed driving and driven gears.

In such construction a double toothed beveled gear 40 is secured to a circumferential flange 41 of the sleeve 42 mounted on the car axle a, before described, and a housing 43 is mounted on the said sleeve 42 on anti-friction bearings 44, 44 carried in retainer 45 provided with lubricant packing rings 45a. The housing 43 incloses the toothed gear 40 and forms a lubricant chamber therefor. A housing section 46 is bolted to the housing 43 comprising journal box portions 47, 48 in which are journaled shafts 49, 50 carrying on their inner ends beveled toothed pinions 51, 52 meshing with the respective sides of the double beveled toothed gear 40.

The shafts 49, 50 are journaled on selfaligning tapered roller bearings 53, 54 riding on tapered races 55, 56; locking nuts 58, 59 are provided on the shafts 49, 50 bearing against the adjacent inner races 56 and are thus adapted to sustain both radial and thrust loads and to hold the toothed pinions in correct mesh with the toothed gear 40.

By this construction the side thrusts of the pinions 51, 52 on the gear 40 are balanced and the car axle will not tend to be crowded over to one side or the other.

Cover plates 60 are secured on the housing section 46 through which the ends of the shafts 49, 50 project and to which may be connected the devices to be operated by the means heretofore described.

Referring to Figs. 11 to 12 inclusive: A cylindrical driving friction gear 70 is mounted directly on the car axle 71, and engages with a cylindrical driven friction gear 72, on the shaft 73 of which is mounted a spur pinion 74 meshing with the spur pinion 75.

The housing 76 in its mountings on the car axle 71 includes anti-friction bearings 77, and dirt and weather excluding means, comprising packing 78 and retainer rings 79, 80.

The shaft 81 of the spur pinion 75, is adapted to be connected to an electric generator, or other operated device. The broken-away end of Fig. 11 is assumed to be a duplicate of the end shown; thus the drive has two driven shafts as 81, either or both of which may be connected to the operated device.

The housing has a movable section 76a, hinged at 82, in order that the driven friction gear 72 may be brought into driving relation with the driving friction gear 70; and such relation is maintained by a coil spring 83 arranged as shown.

I claim:

1. In a car axle drive the combination of a driving friction gear carried by the car axle, a driven gear element comprising two friction pinions, one thereof adapted for operative connection to an operated device, one of said gear elements straddling the other, a housing inclosing the drive, and movable on the axis of the car axle, the driven gear element being journaled in the housing axially movable towards the driving gear, means suspending the housing from the car axle truck frame adapted to accommodate universal movement of the housing relatively to the truck frame and means including a spring for holding the driven gear element in operative relation with the driving gear.

2. In a car axle drive the combination of a driving friction gear carried by the car axle, a driven gear element comprising two friction pinions either thereof adapted for operative connection to an operated device, one of said gear elements straddling the other, a housing inclosing the drive, and movable on the axis of the car axle, the driven gear element being journaled in the housing axially movable towards the driving gear, means suspending the housing from the car axle truck frame adapted to accommodate universal movement of the housing relatively to the truck frame and means including a spring for holding the driven gear element in operative relation with the driving gear.

3. In a car axle drive the combination of a driving friction gear carried by the car axle, a split sleeve mounted on the car axle, a driving friction gear rigid on said sleeve, a driven gear element comprising two friction pinions, one thereof adapted for operative connection to an operated device, one of said gear elements straddling the other, a housing inclosing the drive, and movable on the axis of the car axle, the driven gear element being journaled in the housing axially movable towards the driving gear, means suspending the housing from the car axle truck frame adapted to accommodate universal movement of the housing relatively to the truck frame and means including a spring for holding the driven gear element in operative relation with the driving gear.

4. In a car axle drive the combination of a driving friction gear carried by the car axle, a driven gear element comprising two friction pinions, one thereof adapted for operative connection to an operated device, one of said gear elements straddling the other, a housing inclosing the drive, and movable on the axis of the car axle, the driven gear element being journaled in the housing axially movable towards the driving gear and means including a spring for holding the driven gear element in operative relation with the driving gear.

5. In a car axle drive the combination of a driving friction gear carried by the car axle, a driven gear element comprising two friction pinions, one thereof adapted for operative connection to an operated device, one of said gear elements straddling the other, a housing inclosing the drive, and movable on the axis of the car axle, the driven gear element being journaled in the housing axially movable towards the driving gear, the mounting of the housing on the axle including anti-friction bearings and weather and dirt excluding means and means including a spring for holding the driven gear element in operative relation with the driving gear.

6. In a car axle drive the combination of a driving friction gear carried by the car axle, a driven gear element comprising two friction pinions one thereof adapted for operative connection to an operated device, one of said gear elements straddling the other, a housing inclosing the drive, and movable on the axis of the car axle, the housing section including spaced journal boxes provided with thrust-bearings in which the shafts of said pinions are journaled, a movable cover-plate mounted on said journal boxes engaging said thrust-bearings and means including a spring for holding the driven gear element in operative relation with the driving gear.

7. In a car axle drive the combination of a driving friction gear carried by the car axle, a driven gear element comprising two friction pinions one thereof adapted for operative connection to an operated device, one of said gear elements straddling the other, a housing inclosing the drive, and movable on the axis of the car axle, the housing section including spaced journal boxes provided with thrust-bearings in which the shafts of said pinions are journaled, a movable cover-plate mounted on said journal boxes engaging said thrust-bearings having a housing portion located between said journal boxes, and means including a spring located in the housing portion of the cover plate for holding the driven gear element in operative relation with the driving gear.

8. In a car axle drive the combination of a driving bevel friction gear carried by the car axle, two bevel friction pinions engaging opposite sides of said driving gear, one of said pinions adapted for operative connection to an operated device, a housing inclosing the drive, and movable on the axis of the car axle, the driven gear element being journaled in the housing axially movable towards the driving gear and means including a spring for holding the driven gear element in operative relation with the driving gear.

9. In a car axle drive the combination of a driving bevel friction gear carried by the car axle, two bevel friction pinions engaging opposite sides of said driving gear, one of said pinions adapted for operative connection to an operated device, a housing inclosing the drive, and movable on the axis of the car axle, the driven gear element being journaled in the housing axially movable towards the driving gear, means suspending the housing from the car axle truck frame adapted to accommodate universal movement of the housing relatively to the truck frame and means including a spring for holding the driven gear element in operative relation with the driving gear.

10. In a car axle drive the combination of a driving bevel friction gear carried by the car axle, two bevel friction pinions engaging opposite sides of said driving gear, one of said pinions adapted for operative connection to an operated device, a housing inclosing the drive, and movable on the axis of the car axle, the driven gear element being journaled in the housing axially movable towards the driving gear, the mounting of the housing on the axle including anti-friction bearings and weather and dirt excluding means and means including a spring for holding the driven gear element in operative relation with the driving gear.

11. In a car axle drive the combination of a driving bevel friction gear carried by the car axle, two bevel friction pinions engaging opposite sides of said driving gear, one of said pinions adapted for operative connection to an operated device, a housing inclosing the drive, and movable on the axis of the car axle, the driven gear element being journaled in the housing axially movable towards the driving gear, means suspending the housing from the car axle truck frame adapted to accommodate universal movement of the housing relatively to the truck frame, the mounting of the housing on the axle including anti-friction bearings and weather and dirt excluding means and means including a spring for holding the driven gear element in operative relation with the driving gear.

12. In a car axle drive, the combination of a driving friction gear element carried by the car axle, a driven friction gear element, a housing inclosing the drive, the driven gear element being journaled in said housing which is axially movable to effect the operative relation of said gear-elements and means for maintaining such relation.

13. In a car axle drive, the combination of a driving friction gear element carried by the car axle, a driven friction gear element, a divided housing inclosing the drive comprising a section mounted on the axle over said driving gear element and a complementary section inclosing said driven gear element, the driven gear element being journaled in said complementary housing section and movable to bring the gear elements into operative relation and means for maintaining such relation.

14. In a car-axle drive, the combination of a driving friction gear element carried by the car axle, a driven friction gear element, a divided housing inclosing the drive, comprising a section mounted on the axle over said driving-gear element and a complementary section inclosing said driven gear element, anti-friction bearings and dirt and weather excluding means being included in said mounting, the driven gear element being journaled in said complementary housing section and movable to bring the gear elements into cooperative relation, and means including a spring for maintaining such relation.

CARL F. GERLINGER.